US009336433B1

(12) United States Patent
Ortiz et al.

(10) Patent No.: US 9,336,433 B1
(45) Date of Patent: May 10, 2016

(54) VIDEO FACE RECOGNITION

(71) Applicant: University of Central Florida Research Foundation, Inc., Orlando, FL (US)

(72) Inventors: Enrique Ortiz, Oviedo, FL (US); Mubarak Shah, Winter Park, FL (US); Alan Wright, Winter Springs, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 175 days.

(21) Appl. No.: 14/340,062

(22) Filed: Jul. 24, 2014

Related U.S. Application Data

(60) Provisional application No. 61/857,957, filed on Jul. 24, 2013, provisional application No. 62/000,297, filed on May 19, 2014.

(51) Int. Cl.
*G06K 9/00* (2006.01)
*G06K 9/62* (2006.01)
*G06K 9/32* (2006.01)
*G06T 11/60* (2006.01)
*G06K 9/46* (2006.01)

(52) U.S. Cl.
CPC ........ *G06K 9/00228* (2013.01); *G06K 9/00268* (2013.01); *G06K 9/3233* (2013.01); *G06K 9/4642* (2013.01); *G06K 9/6202* (2013.01); *G06K 9/6215* (2013.01); *G06T 11/60* (2013.01)

(58) Field of Classification Search
CPC ........................ G06K 9/00228; G06K 9/00268
See application file for complete search history.

(56) References Cited

U.S. PATENT DOCUMENTS

| 2007/0239642 A1* | 10/2007 | Sindhwani | G06K 9/6269 706/25 |
| 2015/0269441 A1* | 9/2015 | Mj | G06K 9/00744 382/103 |

OTHER PUBLICATIONS

E. G. Ortiz, A. Wright, and M. Shah, "Face recognition in movie trailers via mean sequence sparse representation-based classification," in IEEE Conference on Computer Vision and Pattern Recognition, 2013.*
E. G. Ortiz, A. Wright, and M. Shah, "Video Face Recognition" http://enriquegortiz.com/wordpress/enriquegortiz/research/face-recognition/video-face-recognition/ Retrieved Mar. 2, 2016.*
Zhao et al., Large scale learning and recognition of faces in web videos, FG (2008).
Chen et al., Dictionary-based face recognition from video, ECCV pp. 766-779 (2012).

(Continued)

*Primary Examiner* — Bhavesh Mehta
*Assistant Examiner* — Ian Lemieux
(74) *Attorney, Agent, or Firm* — Andriy Lytvyn; Smith & Hopen, P.A.

(57) ABSTRACT

The present invention is a complete end-to-end video face recognition system. The invention performs a track-by-track labeling of all tracks within a video. A novel algorithm Mean Sequence SRC (MSSRC) is applied to a face track to perform video face recognition using a joint optimization to leverage all of the available video data and the knowledge that the face track frames belong to the same individual. Additionally the system constructs a probabilistic affinity graph combining appearance and co-occurrence similarities to model the relationship between face tracks in a video. Finally, using this relationship graph, random walk analysis is employed to propagate strong class predictions among similar face tracks, while dampening weak predictions.

20 Claims, 10 Drawing Sheets

(56) References Cited

OTHER PUBLICATIONS

Bauml et al., Semi supervised Learning with Constraints for Person Identification in Multimedia Data, CVPR, pp. 3602-3609 (2013).

Hadid et al., From still image to video based face recognition: an experimental analysis, FG (2004).

Zhou et al., Probabilistic recognition of human faces from video, CVIU (2003).

Yamaguchi et al, Face recognition using temporal image sequence, FG (1998).

Lee et al., Online learning of probabilistic appearance manifolds for video-based recognition and tracking, CVPR, pp. 852-859 (2005).

Cinbis et al., Unsupervised metric learning for face identification in TV video, ICCV (2011).

Bojanowski et al., Finding actors and actions in movies, ICCV (2013).

Everingham et al., Taking the bite out of automated naming of characters in TV video, CVIU (2009).

Tapaswi et al., "Knock! Knock! Who is it?" Probabilistic Person Identification in TV-Series, CVPR (2012).

Arandjelovic et al., Automatic Cast Listing in Feature-Length Films with Anisotropic Manifold Space, CVPR (2006).

J. Wright, et al., Robust face recognition via sparse representation, TPAMI (2009).

Gallagher et al., Using a Markov Network to Recognize People in Consumer Images, ICIP (2007).

Kapoor et al., Which faces to tag: Adding prior constraints into active learning, ICCV pp. 1058-1065 (2009).

Lin et al., Joint people, event, and location recognition in personal photo collections using cross-domain context, ECCV. Springer-Verlag (2010).

\* cited by examiner

VIDEO FACE RECOGNITION

CROSS-REFERENCE TO RELATED APPLICATIONS

This application claims priority of U.S. Provisional Patent Application No. 61/857,957 entitled "Video Face Recognition" filed Jul. 24, 2013, and also claims priority to Provisional Patent Application No. 62/000,297, entitled "Video Face Recognition via Sparse Representation and Affinity-based Propagation" filed May 19, 2014, the contents of both provisional application are incorporated herein by reference.

BACKGROUND OF THE INVENTION

1. Field of the Invention

This invention relates to face recognition. More specifically, it relates to identifying a video face track using a large dictionary of still face images of a few hundred people, while rejecting unknown individuals.

2. Brief Description of the Prior Art

Video face identification has recently risen to the forefront of face recognition research. Although still-image face recognition research has been ongoing for approximately three decades, application of the still-image face recognition to video-based imagery is a complex process with a number of challenges due to a variety of factors including a person's motion and unconstrained variations in pose, occlusion, and illumination. On the other hand, some aspects of video imagery create opportunity for a more efficient face recognition. For example, video-based imagery provides numerous samples of a person from differing viewpoints, which could be harnessed to provide a strong prediction of the person's identity. Moreover, throughout a long video like a movie or a television show episode the relationship of face tracks can be harnessed using strong affinity metrics.

In the last few years, there has been increased interest in face recognition in sitcoms. These methods have focused on using additional context such as script text, audio, and clothing-however, the employed face identification methods have not been very accurate.

Existing video face recognition methods tend to perform classification on a frame-by-frame basis and later combine those predictions using an appropriate metric. Applying the recently popular Sparse Representation Based Classification's $l^1$-minimization in this fashion is computationally expensive.

Most video-based face recognition methods, if they retain any temporal information, only consider the relationship between frames, thus ignoring any temporal or visual affinity between individual face tracks. In any given sitcom or movie scene, many face tracks are generated for present actors. This result is sometimes due to poor tracking, shot changes, or pose variations. For this reason, face predictions may be noisy, meaning that a face track may be classified correctly at one point, and then a later track of the same person may be identified incorrectly.

Current video face recognition techniques fall into one of four categories: key-frame based, temporal model based, image-set matching based, and context based.

Key-Frame Based Methods

Key-frame based methods generally perform a prediction on the identity of each key-frame in a face track followed by a probabilistic fusion or majority voting to select the best match. Due to the large variations in the data, key-frame selection is claimed to be crucial in this paradigm. One version of this method disclosed in Zhao et al., *Large scale learning and recognition of faces in web videos*, FG (2008) involves using a database with still images collected from the Internet. A model over this dictionary is established by learning key faces via clustering. These cluster centers are compared to test frames using a nearest-neighbor search followed by majority, probabilistic voting to make a final prediction.

Chen et al., *Dictionary-based lace recognition from video*, ECCV pp. 766-779 (2012) dictionary-based methods focus on dictionary learning done on a per face track basis. Finally, Bäuml et al., *Semisupervised Learning with Constraints for Person Identification in Multimedia Data*, CVPR, pp. 3602-3609 (2013) discloses a method that does not use key-frames, but similarly performs probabilistic voting over all frames in a track using a classifier trained via Maximum Likelihood Regression (MLR).

Temporal Based Methods

Temporal model based methods learn the temporal, facial dynamics of the face throughout a video. Several methods employ Hidden Markov Models (HMM) for this purpose. A version of this method disclosed in Hadid et al., *From still image to video-based face recognition: an experimental analysis*, FG (2004) employ a still image training library by imposing motion information upon it to train an HMM. Zhou et al., *Probabilistic recognition of human faces from video*, CVIU (2003) discloses probabilistic generalization of a still-image library to accomplish video-to-video matching. Generally training these models is prohibitively expensive, especially when the dataset size is large.

Image-Set Matching Based Methods

Image-set matching based methods allow the modeling of a face track as an image-set. Many methods-such as the ones disclosed in Yamaguchi et al, *Face recognition using temporal image sequence*, FG (1998) and Lee et al., *Online learning of probabilistic appearance manifolds for video-based recognition and tracking*, CVPR, pp. 852-859 (2005)—perform a mutual subspace distance where each face track is modeled in its own subspace from which a distance is computed between each face track. They are effective with clean data, but these methods are sensitive to the variations inherent in video face tracks. Some experts attempt to address this issue by learning a subspace for each pose within a face track. Other methods-such as the one disclosed in Cinbis et al., *Unsupervised metric learning for face identification in TV video*, ICCV (2011)—take a more statistical approach using Logistic Discriminant-based Metric Learning (LDML) to learn a relationship between images in face tracks, where the inter-class distances are maximized. LDML is very computationally expensive and focuses more on learning relationships within the data, without directly relating the test track to the training data.

Context Based Methods

Context based methods have been popular due to their applicability to movies and sitcoms. These methods generally focus on simple face recognition techniques supplemented by context. Several variations of this method-such as the ones disclosed in Bojanowski et al., *Finding actors and actions in movies*, ICCV (2013), Everingham et al., *Taking the bite out of automated naming of characters in TV video*, CVIU (2009), and Tapaswi et al., *"Knock! Knock! Who is it?" Probabilistic Person Identification in TV-Series*. CVPR (2012)—perform person identification, where they use all available information, e.g. clothing appearance and audio, to identify the cast rather than the facial information alone. A small user selected sample of characters may be used in the given movie to compute a pixel-wise Euclidean distance to handle occlusion. Other embodiments of this method-such as the one disclosed in Arandjelovic et al., *Automatic Cast List-*

*ing in Feature-Length Films with Anisotropic Manifold Space*, CVPR (2006)—use a manifold for known characters, which successfully clusters input frames.

Still-Image Methods

Still-Image based literature is vast, and one popular approach entitled Sparse Representation based Classification (SRC) is disclosed in J. Wright, et al., *Robust face recognition via sparse representation*, TPAMI (2009). SRC is based on a principle that a given test face can be represented by a linear combination of images from a large dictionary of faces. The key concept is enforcing sparsity on the representation, since a test face can be reconstructed best from a small subset of the large dictionary, i.e. training faces of the same class. A straightforward adaptation of this method would be to perform estimation on each frame and fuse results probabilistically, similarly to key-frame based methods. However, $l^1$-minimization is known to be computationally expensive, and therefore, what is needed is a constrained optimization with the knowledge that the images within a face track are of the same person. Imposing this fact reduces the problem to computing a single $l^1$-minimization over the average face track.

Graph-Based Methods

Several graph-based methods employ Markov models in an active-learning paradigm in which a few samples are selected to be labeled by the user, then used to label the rest of the data. The version of this method disclosed in Gallagher et al., *Using a Markov Network to Recognize People in Consumer Images*, ICIP (2007) involves the step of creating a Markov network where similarity edges are formed between faces in different photos and dissimilarity edges between the others, with an edge weight defined by appearance. This graph is then used in Loopy Belief Propagation to label all unlabeled test samples.

Another reference, Kapoor et al., *Which faces to tag: Adding prior constraints into active learning*, ICCV pp. 1058-1065 (2009), combines Gaussian Processes to enforce label smoothness with Markov Random Fields to encode the match and non-match structures, where matches are images of the same individual (faces within a track) and non-matches are faces in the same shot. More recently, Lin et al., *Joint people, event, and location recognition in personal photo collections using cross-domain context*, ECCV. Springer-Verlag (2010) disclosed creating a probabilistic, Markov framework using multiple contexts (faces, events, and location) to improve recognition. One advantage of these methods is that they are iterative methods that allow feedback from users and thus label the unlabeled data with few samples. However, the efficacy of graph-based method diminishes when a large number of face tracks is involved due to their inability to smooth the initial predictions across all tracks in one optimization.

Accordingly, what is needed is a new more efficient video face recognition system. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The invention is a fully automatic end-to-end system for video face recognition, which includes face tracking and identification leveraging information from both still images for the known dictionary and video for recognition. For stage-one recognition, a new algorithm Mean Sequence SRC (MSSRC) performs a joint optimization using all of the available image data to perform video face recognition. In stage-two, the relationship between face tracks is leveraged in a movie trailer or sitcom episode to smooth label predictions throughout, thus correcting weak misclassifications.

In the experiments, it has been shown that the MSSRC method according to the present invention matches or outperforms the face recognition methods currently known in the art. The smaller datasets demonstrate a lack of contribution from affinity-based propagation due to already high performance and the fact that the face tracks are often from different videos. However, for more complex datasets, a performance increase of 4% over the state-of-the-art was achieved by combining both stages of the invention. The MSSRC method outperforms most prior art methods on real-world, unconstrained videos. Moreover, the invention especially excels at rejecting unknown identities outperforming the next best method in terms of average precision by 8% when using MSSRC alone, and 20% when both MSSRC and affinity-based propagation are combined.

While the current state of the art fuses different contextual inputs, the present invention shifts the focus to the difficult task of developing a highly precise method for unconstrained video face recognition using only the facial data. This was achieved using a two-stage process that first labels all of the face tracks and later refines those predictions using the interrelatedness of the tracks within a video.

The novel algorithm entitled Mean Sequence Sparse Representation based Classification (MSSRC) performs a joint optimization over all faces in the track at once. Though this seems expensive, this optimization reduces to a single $l^1$-minimization over the mean face track, thus reducing the classification problem to one with inherent computational and practical benefits. The invention embraces a principle that within related scenes, there is a reasonable assumption that the people of interest do not change appearance much, therefore a strong relationship can be assumed between face tracks of the same person.

Given the key insight that algorithms tend to misclassify face tracks visually similar to those correctly labeled, the present invention uses an affinity-based method to share classification knowledge throughout an entire video. An affinity graph is created to relate every face track to every other face track in a given video. Then random walks technique is used to propagate correct labels and demote wrongly labeled face tracks to improve prediction results over the entire movie. The probabilistic affinity graph is constructing using the appearance and co-occurrence of predicted labels, to smooth the label predictions of closely related face tracks via random walk analysis.

The invention aims to perform video face recognition across domains, leveraging thousands of labeled, still images gathered from the Internet, specifically the PubFig and LFW datasets, to perform face recognition on real-world, unconstrained videos.

The invention has utility for the open universe scenarios in which it is important to recognize and reject unknown identities, i.e. we identify famous actors appearing in movie trailers while rejecting background faces that represent unknown extras. We show our method outperforms existing methods in precision and recall, exhibiting the ability to more accurately reject unknown or uncertain identities.

In an embodiment, the invention is a non-transitory computer-readable medium having stored thereon computer-executable instructions that, in response to being executed by a computing device, cause the computing device to perform a sequence of operations. The input consists of a video clip having a plurality of frames and a dictionary of still images of a plurality of faces having known identities. A first face within the video clip is detected. The face is then tracked over the plurality of frames of the video clip to obtain a first face track. Next, a mean of the first face track is computed. An $l^1$-minimization is performed on the mean of the first face track under a predefined sparsity constraint.

Class probabilities are computed to establish an initial identity of the first face and a confidence value, wherein the initial identity of the first face is selected from the dictionary. Affinity metrics are calculated and fused to obtain a similarity matrix. The similarity matrix is normalized to obtain a transition probability matrix, which allows propagation of the transition probability matrix and confidence values to subsequent face tracks to obtain a final face identification and a final confidence value for each face track.

In an embodiment, the affinity metrics are selected from the group consisting of an appearance affinity, a coefficient affinity, and a co-occurrence affinity. A single coefficient vector is imposed on the plurality of frames within the first face track.

In an embodiment, the first face track may be ended in response to the first face not being detected in a predetermined number of frames following a frame in which the first face was initially detected.

In an embodiment, the facial features are extracted from the still images within the dictionary by aligning the still images based on eye locations, removing a first order brightness gradient from the still images, performing histogram equalization. Local and global histograms may be used to determine whether a second face is associated with the first face track.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
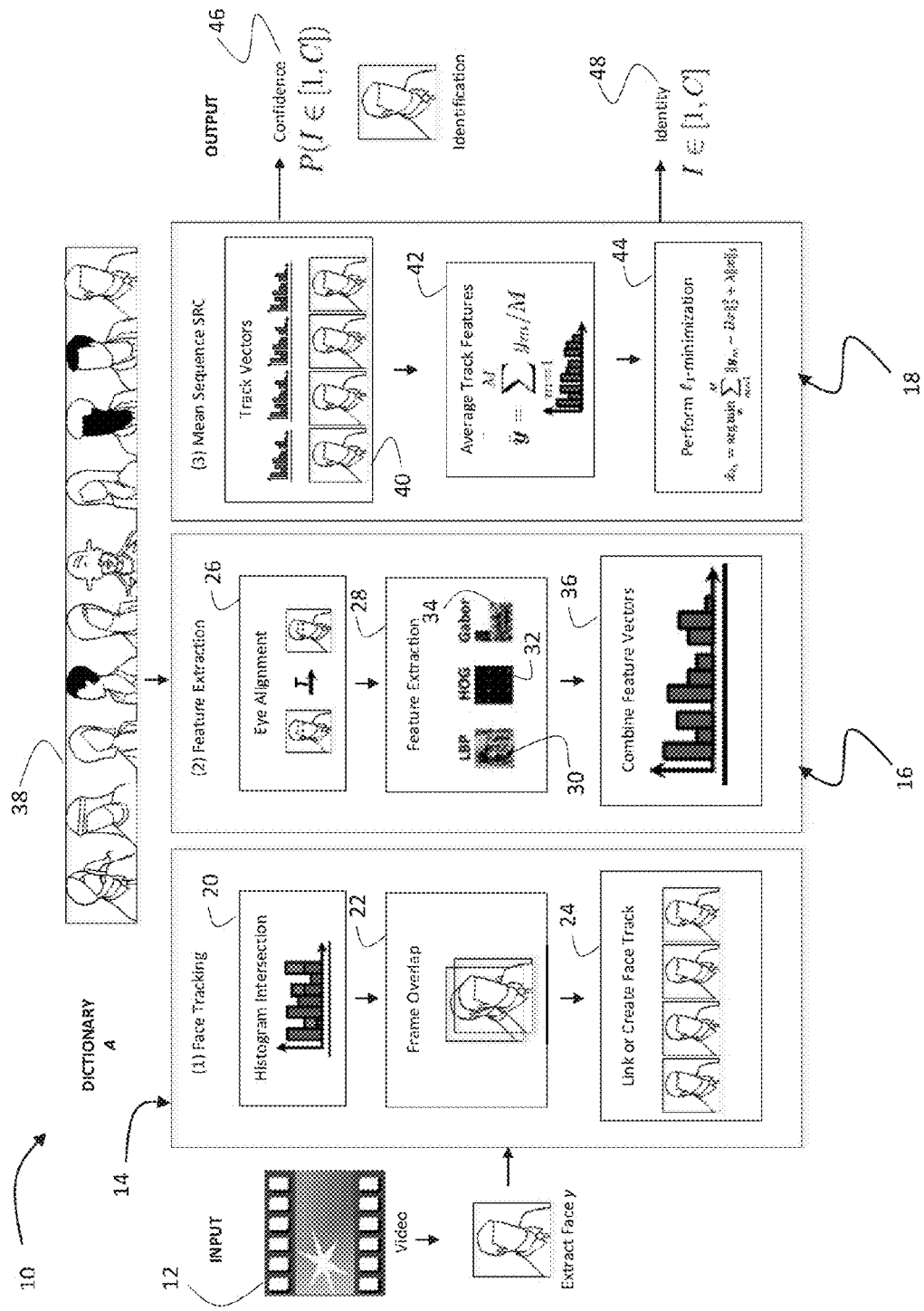
FIG. 1 is a schematic illustration depicting the first stage of the face recognition method.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention is a complete end-to-end system for video face recognition comprising two stages. The first stage 10 depicted in FIG. 1 performs face tracking 14, feature extraction 16, and identification using the sparse representation-based method 18 for video face tracks. The second stage takes the initial predictions as input and smoothes them across the face tracks in a given video using the relationship between them. The remainder of this section explains in detail each of these stages.

Stage 1: Initial Recognition

First stage 10 of the video face recognition system comprises three steps 14, 16, and 18. First, an algorithm is used for face tracking based on face detections from video. Next, the features used to describe the faces and handle variations in pose, lighting, and occlusion are chronicled. Finally, optimization for video face recognition that classifies a video face track based on a dictionary 28 of still images is used.

Face Tracking

The invention performs the difficult task of face tracking 14 based on face detections extracted using the high performance SHORE face detection system disclosed in Kumar, et al., *Describable visual attributes for face verification and image search*, TPAMI (2011) and generates a face track based on two metrics. To associate a new detection to an existing track, in step 22, the metric determines the ratio of the maximum sized bounding box encompassing both face detections to the size of the larger bounding box of the two detections. The formulation is as follows:

$$d_{spatial} = \frac{w*h}{\max(h_1*w_1, h_2*w_2)} \quad (1)$$

where $(x_1; y_1; w_1; h_1)$ and $(x_2; y_2; w_2; h_2)$ are the $(x, y)$ location and the width and height of the previous and current frames respectively. The overall width w and height h are computed as $w=\max(x_1+w_1,x_2+w_2)-\min(x_1, x_2)$ and $h=\max(y_1+w_1, y_2+w_2)-\min(y_1,y_2)$. This metric encodes the dimensional similarity of the current and previous bounding boxes, intrinsically considering the spatial information. The second tracking metric takes into account the appearance information via a local color histogram of the face.

In step 20, the distance is computed as a ratio of the histogram intersection of the RGB histograms with thirty bins per channel of the last face of a track and the current detection to the total summation of the histogram bins:

$$d_{appearance} = \sum_{i=1}^{n} \min(a_i, b_i) \Big/ \sum_{i=1}^{n} a_i + b_i, \quad (2)$$

where a and b are the histograms of the current and previous face.

In step 24, each new face detection is compared to existing tracks: if the location and appearance metrics are similar, the face is added to the track, otherwise a new track is created. Finally, a global histogram is used for the entire frame, thereby encoding scene information to detect scene boundaries. A lifespan of a predetermined number of frames may be imposed-meaning that a track is ended if the predetermined number of frames yields no detection. In one embodiment, the predetermined number of frames is set to twenty.

Feature Extraction

Feature extraction 16 involves several steps. First, since real-world datasets contain pose variations even after alignment, in step 28, three local features are used: Local Binary Patterns (LBP) 30, Histogram of Oriented Gradients (HOG) 32, and Gabor wavelets 34. More features aid recognition, but increase the computational cost.

Prior to performing feature extraction, all images are eye-aligned in step 26 using eye locations from SHORE and normalized by subtracting the mean, removing the first order brightness gradient, and performing histogram equalization. In step 36, extracted feature vectors are combined.

In one example, Gabor wavelets were extracted with one scale $\lambda=4$ at four orientations $\theta=\{0°; 45°, 90°, 135°\}$ with a tight face crop at a resolution of 25×30 pixels. A null Gabor filter included the raw pixel image (25×30) in the descriptor. The standard $LBP_{8,2}^{U2}$ (uniform circular patterns of 8 pixels and a radius of 2) and HOG descriptors were extracted from 72×80 loosely cropped images. Each feature had a histogram size of 59 and 32 over 9×10 and 8×8 pixel patches, respectively. All descriptors were scaled to unit norm, dimensionality reduced with PCA to 1536 dimensions each, and zero-meaned.

Mean Sequence Sparse Representation-Based Classification (MSSRC)

MSSRC 18 is illustrated in FIG. 1 and is explained below. Given a test image y and training set B, it is known that the images of the same class to which y should match is a small subset of B, and their relationship is modeled by y=Bx, where x is the coefficient vector relating them. Therefore, the coefficient vector x should only have non-zero entries for those few images from the same class and zeroes for the rest. Imposing this sparsity constraint upon the coefficient vector x results in the following formulation of the MSSRC method 18:

---

Algorithm 1 Mean Sequence SRC (MSSRC)

1. Input: Training gallery B, test face track Y $[y_1, y_2, \ldots, y_M]$, and sparsity weight parameter $\lambda$.
2. Normalize the columns of B to have unit $l^2$-norm.
3. Compute mean of the track $\bar{y} = \Sigma_{m=1}^{M} y_m/M$ and normalized to unit $l^2$-norm.

5. Solve the $l^1$-minimization problem $$\tilde{x}_{l_1} = \arg\min_x \sum_{m=1}^{M} \|\bar{y} - Ax\|_2^2 + \lambda\|x\|_1 \quad (3)$$

6. Compute class probabilities $$p(l_c \mid \bar{y}) = 1 - \frac{r_c(\tilde{y})}{\sum_c r_c(\tilde{y})} \quad (9)$$

7. Output identity l and confidence $\chi$ $$l = \max_c p(l_c \mid \tilde{y}) \quad (10)$$

$$\chi = \frac{C \cdot \max_j \|x_j\|_1 / \|\tilde{x}\|_1 - 1}{C - 1} \quad (11)$$

---

$$\tilde{x}_{l_1} = \arg\min_x \|y - Bx\|_2^2 + \lambda\|x\|_1, \quad (3)$$

where the $l^1$-norm enforces a sparse solution by minimizing the absolute sum of the coefficients and $\lambda$ specifies how much weight is given to this norm. The invention takes into account that all of the images y from the face track $Y=[y_1; y_2; \ldots; y_M]$ belong to the same person. This yields a high degree of correlation amongst the sparse coefficient vectors $x_j \forall j \in [1 \ldots M]$, where M is the length of the track. Therefore, an agreement on a single coefficient vector x determines the linear combination of training images B that make up the unidentified person. In fact, with sufficient similarity between the faces in a track, nearly the same coefficient vector may be recovered for each frame. For this reason, a single coefficient vector is enforced for all frames. Mathematically, this means the sum squared residual error over the frames should be $l^1$-minimized. This constraint is enforced on the solution of Eqn. 3 as follows:

$$\tilde{x}_{l_1} = \arg\min_x \sum_{m=1}^{M} \|y_m - Bx\|_2^2 + \lambda\|x\|_1 \quad (4)$$

where the $l^2$ error is minimized over the entire image sequence, while assuming the coefficient vector x is sparse and the same over all of the images.

Focusing on the first part of the equation, more specifically the $l^2$ portion, can be rearranged as follows:

$$\sum_{m=1}^{M}\|y_m - Bx\|_2^2 = \sum_{m=1}^{M}\|y_m - \bar{y} + \bar{y} - Bx\|_2^2 \quad (5)$$

$$= \sum_{m=1}^{M}(\|y_m - \bar{y}\|_2^2 + 2(y_m - \bar{y})^T(\bar{y} - Bx) + \|\bar{y} - Bx\|_2^2),$$

where $\bar{y} = \Sigma_{m=1}^{M} y_m / M$. However.

$$\sum_{m=1}^{M} 2(y_m - \bar{y})^T(\bar{y} - Bx) = 2\left(\sum_{m=1}^{M} y_m - M\bar{y}\right)^T (\bar{y} - Bx) = 0(\bar{y} - Bx) = 0. \quad (6)$$

Thus equation 6 becomes:

$$\sum_{m=1}^{M}\|y_m - Bx\|_2^2 = \sum_{m=1}^{M}\|y_m - \bar{y}\|_2^2 + M\|\bar{y} - Bx\|_2^2, \quad (7)$$

Where the first part of the sum is a constant. Therefore, the final simplification of the original minimization is obtained as follows:

$$\begin{aligned}\tilde{x}_{l_1} &= \arg\min_x \sum_{m=1}^{M}\|y_m - Bx\|_2^2 + \lambda\|x\|_1^2 \\ &= \arg\min_x M\|\bar{y} - Bx\|_2^2 + \lambda\|x\|_1 \\ &= \arg\min_x \|\bar{y} - Bx\|_2^2 + \lambda\|x\|_1\end{aligned} \quad (8)$$

where M, by division, is absorbed by the constant weight λ. By this sequence, in step 44, optimization reduces to the $l^1$-minimization of x for the mean face track $\bar{y}$, which was calculated in step 42 from the face track vectors obtain in step 40.

This conclusion, that enforcing a single, consistent coefficient vector x across all images in a face track Y is equivalent to a single $l^1$-minimization over the average of all the frames in the face track allows the method according to the present invention to be robust yet fast. Instead of performing M individual $l^1$-minimizations over each frame and classifying via some voting scheme as generally done in the art, the present invention performs a single $l^1$-minimization on the mean of the face track, which results not only a significant speed up, but is also theoretically sound. Furthermore, in subsequent sections it is empirically validated that this method outperforms other forms of temporal fusion and voting amongst individual frames.

Finally, the average test track $\bar{y}$ is classified by determining the class of training samples that best reconstructs the face from the recovered coefficients. First, the class probabilities are computed according to the following equation:

$$p(l_c|\bar{y}) = 1 - \frac{r_c(\bar{y})}{\sum_c r_c(\bar{y})}, \quad (9)$$

where $r_c = \|\bar{y} - B_c x_c\|$ is the reconstruction error and $x_c$ are the recovered coefficients from the global solution $\tilde{x}_{l_1}$ that belong to class c. The most likely class is then the most probable class. Identity 48 is calculated using the following expression:

$$l = \max_c p(l_c|\bar{y}). \quad (10)$$

Confidence 46 in the determined identity 48 is obtained using the Sparsity Concentration Index (SCI), which is a measure of how distributed the residuals are across classes:

$$\chi = \frac{C \cdot \max_j \|x_j\|_1 / \|\tilde{x}\|_1 - 1}{C - 1} \in [0, 1], \quad (11)$$

ranging from 0 (the test face is represented equally by all classes) to 1 (the test face is fully represented by one class).

Stage 2: Affinity-Based Propagation

Figure 2:
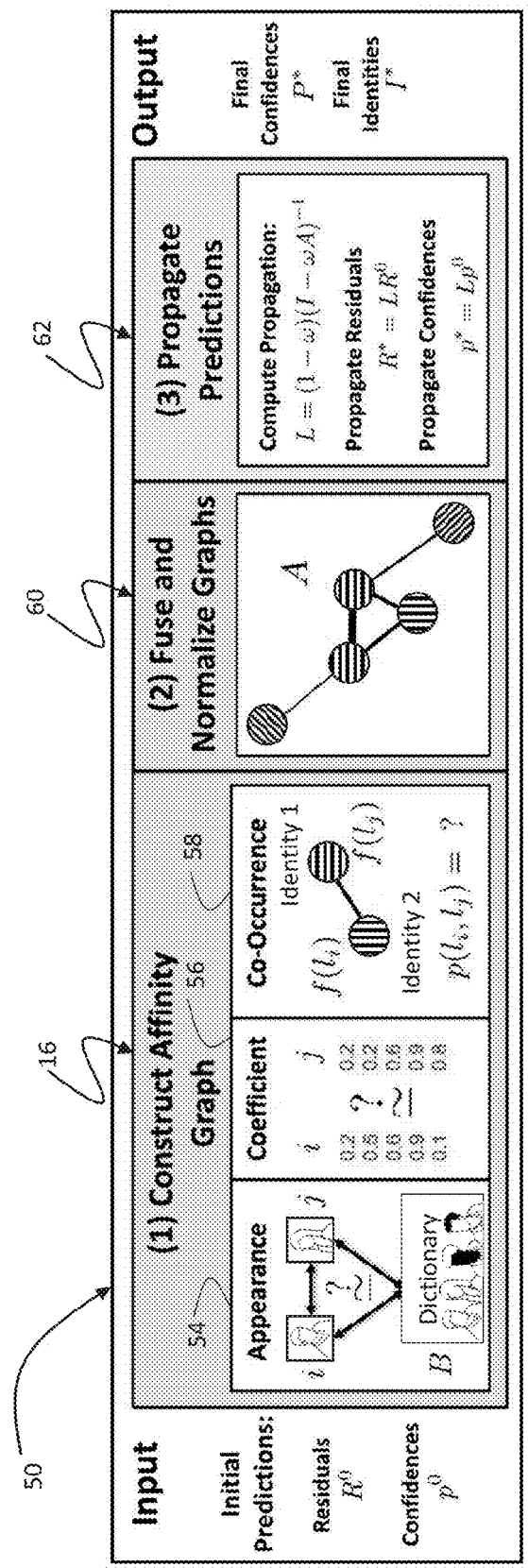
FIG. 2 is a schematic illustration depicting the second stage of the face recognition method.

As shown in the experiments, MSSRC disclosed above performs well by itself, however due to large pose variations, lighting, and other factors, misclassifications are possible. Given the relationship between correctly and incorrectly classified tracks, many of these errors could be corrected. Stage two denoted as element 50 is schematically illustrated in FIG. 2 and accomplishes the tasks of smoothing the predictions throughout a video and sharing information between face tracks.

Face Track Affinity

When creating a relationship among face tracks within a video, the information the face tracks provide is analyzed in step 52. The most useful piece of information is the appearance information because within a video, the appearance of a person remains generally consistent. Analysis based on appearance information is carried out in step 54. In step 56, the coefficient vector denoting a face track's relationship to the images in dictionary 38 obtained is deployed via MSSRC 18, since similar face tracks should correspond to similar images in dictionary 38. Finally, in step 58, the predictions computed by the face recognizer provide useful information of occurrence and co-occurrence of the assigned labels. Combining these three relationships provides a strong description of how information should be shared throughout a given video.

Appearance Affinity is illustrated in step 54. In an embodiment of the invention, the Matched Background Similarity (MBGS) appearance graph was used, which has been effective in the face verification task (same vs. not same). The MBGS metric computes a set-to-set distance between two face tracks $Y_1$ and $Y_2$ using a background set of images B. First, the K nearest neighbors of $Y_1$ to B are used as a negative set to train an SVM with $Y_1$ as the positive set. Next, the trained model is used to classify the frames from track $Y_2$ on which the mean prediction score is computed. The same steps are performed for the second face track $Y_2$ and then the final score is computed as an average of the two. Using this metric the pairwise appearance similarity between each face track can be computed using the following equation:

$$d_n(i,j) = \text{MBGS}(Y_i, Y_j, B). \quad (12)$$

This metric provides information used to make a determination of whether the face tracks look more like each other or the background set.

Coefficient Affinity is illustrated in step 56. Given the output of MSSRC 18, if two face tracks are similar, they should have a similar coefficient vector, meaning that they should be reconstructed by similar images in dictionary 38. Therefore, the cosine distance between coefficient vectors is employed to compute another pairwise similarity:

$$d_c(i, j) = \frac{x_i \cdot x_j}{\|x_i\| \|x_j\|} \quad (13)$$

where $x_i$ and $x_j$ are the coefficient vectors of face tracks $x_i$ and $x_j$ respectively computed by SRC.

Co-Occurrence Affinity analysis is performed in step 58. The co-occurrence similarity of the labels of the two face tracks is considered. Using the label predictions, the frequency of each label in a given trailer is computed and the computed values are used to calculate the Normalized Google Distance as follows:

$$d_o(i, j) = \frac{\max(\log f(l_i), \log f(l_j)) - \log f(l_i, l_j)}{\log G - \min(\log f(l_i), \log f(l_j))}, \quad (14)$$

where $f(l_i)$ and $f(l_j)$ are the frequencies of the predicted labels from tracks i and j respectively, $f(l_i, l_j)$ is the frequency of the two labels occurring together, and G is the total number of predictions. The expression $f(l_i, l_j)$ can be handled in two ways: 1) assume it is zero since no face track should receive two labels or 2) the top k predictions can be taken from the classifier and frequencies and co-occurring frequencies can be computed based on these values. Experiments have revealed that both assumptions yielded near identical results, therefore assumption (1) may be used for simplicity, which reduces to a normalized co-occurrence.

Affinity Fusion

The computation of the aforementioned similarity metrics (Appearance, Coefficient, and Co-Occurrence) allows to construct an affinity relationship between face tracks by fusing all three metrics in step 60. The affinities are first converted into probabilities using the standard sigmoid function and combined using a weighted mean as follows:

$$d(i,j) = \alpha_a \exp(d_a(i,j)/\sigma_a) + \alpha_c \exp(d_c(i,j)/\sigma_c) + \alpha_o \exp(d_o(i,j)/\sigma_o) \quad (15)$$

Where $\sigma$'s and $\alpha$'s are the fusion weighing and smoothing parameters respectively, thus forming the elements of similarity matrix D.

Random Walk Over Label Affinities

Random walk techniques are used in step 62 to propagate predictions to subsequent face tracks. Random walks can be understood as the likeliness of transitioning from node i to node j by means of a probabilistic walk between the most likely nodes in a graph. The nodes are the face tracks and the transition probability being modeled is the likelihood that pairs of nodes are of the same person. The transition probability between face tracks is computed by normalizing the similarity matrix D by the row sum:

$$a(i, j) = \frac{d(i, j)}{\sum_k d(i, k)} \quad (16)$$

where $d(i,j)$ is the similarity between nodes i and j as defined above in Eqn. 15, forming affinity matrix A.

Given the transition probability matrix A obtained via normalization of similarity matrix D, the propagation of labels across the nodes can be defined resulting in a sharing of information with related face tracks (nodes). Such a propagation scheme requires that the label probabilities of highly related nodes be increased and inversely weak labels must be decreased. In the binary case, the probability of each node belongs to the known positive class. The label propagation can be formulated as a weighted sum of the original prediction and the surrounding node probabilities based on their class probability and affinity to the node of interest. Therefore, the class probabilities can be iteratively propagated across the face tracks until an agreement is achieved. The resulting formulation is as follows:

$$p^t(i) = \omega \sum_j p^{t-1}(j) a(i, j) + (1 - \omega) p^0(i), \quad (17)$$

Where $p^{t-i}(j)$ is the predicted class probability from the previous iteration, $a(i,j)$ is the probability of transition between nodes i and j, $p^0(i)$ denotes the initial probability of the current node of interest j, and $\omega$ specifies how much of the current and previous probabilities to keep. Given that it is desirable to propagate the labels for every node, Eqn. 17 can be rewritten in matrix form:

$$p^t = \omega A p^{t-1} + (1-\omega) p^0, \quad (18)$$

where $p^0$ is the initial class probability of the nodes provided by MSSRC.

It can be shown that the iterative method has a unique solution p* following the derivation. To do this, the limit over Eqn. 18 is evaluated given that the initial labeling is $p^0$:

$$p^* = \lim_{n \to \infty} (\omega A)^n p^0 + (1 - \omega) \sum_i^{t-1} (\omega A)^i p^0 \quad (19)$$

Knowing that $p(i,j) \geq 0$ and $\Sigma_j p(i; j) = 1$, the Perron-Frobenius Theorem is used to extrapolate that the spectral radius of A is $\rho(A) \leq 1$. Since $0 < \omega < 1$:

$$\lim_{t \to \infty} (\omega A)^{t-1} = 0.$$

Then knowing that the following limit is a geometric series, the following is equation is obtained:

$$\lim_{t \to \infty} \sum_{i=0}^{t-1} (\omega A)^i = (I - \omega A)^{-1},$$

where I is the identity matrix. Therefore, the sequence $\{p^t\}$ converges to:

$$p^* = (1-\omega)(I-\omega A)^{-1} p^0. \quad (20)$$

Given the solution p*, class association for each node can be determined.

---

Algorithm 2 Affinity-based Propagation

1. Input: Face Tracks $[Y_1, \ldots, Y_N]$, Training gallery B, Initial Predictions $P^0$ and confidences $\chi^0$.
2. For each face track pair compute affinities:

$$d_a(i, j) = \text{MBGS}(Y_i, Y_j, B) \quad (12)$$

$$d_c(i, j) = \frac{x_i \cdot x_j}{\|x_i\| \|x_j\|} \quad (13)$$

-continued

Algorithm 2 Affinity-based Propagation $$d_o(i, j) = \frac{\max(\log f(l_i), \log f(l_j)) - \log f(l_i, l_j)}{\log G - \min(\log f(l_i), \log f(l_j))} \quad (14)$$

3. Fuse affinity metrics:

$$d(i, j) = \sum_{k=\{a,o,c\}} \alpha_k \exp(d_k(i, j)/\sigma_k) \quad (15)$$

5. Normalize affinity for random walk:

$$a(i, j) = \frac{d(i, j)}{\sum_k d(i, k)} \quad (16)$$

6. Propagate class predicitons probabilities and confidences:
   $P^* = (1 - \omega)(I - \omega A)^{-1} P^0$ (21)
   $\chi^* = (1 - 1 - \omega)(I - \omega A)^{-1} \chi^0$ (23)

7. Output: confidences $\chi$ and identities
   $l_i = \max_{c \leq C} P_{ic}^*$ (22)

For the multi-class scenario, $p^0$ is replaced with the matrix $P^0$ containing the class probabilities for each node, which results in:

$$P^* = (1-\omega)(I-\omega A)^{-1} P^0. \quad (21)$$

Therefore, the labels for each class are determined as follows:

$$l_i = \max_{c \leq C} P_{ic}^*, \quad (22)$$

where i is the node or face track of interest, c is the current class, and C is the number of classes.

Similarly, for the MSSRC method, the confidence in the prediction for each node is propagated using the following equation:

$$\chi^* = (1-\omega)(I-\omega A)^{-1} \chi^0. \quad (23)$$

where the resulting values provide an accurate rejection criterion.

Experiments

In this section, the tracking method according to the present invention is compared to a standard method used in the literature. The video face recognition method according to the present invention is evaluated on four existing datasets, YOUTUBE Faces, YOUTUBE Celebrities, BUFFY, and THE BIG BANG THEORY. The present invention entitled MSSRC is evaluated against other face recognition method using a new Movie Trailer Face Dataset, showing the strengths and weaknesses of each and thus proving experimentally the validity of MSSRC. Finally, adding affinity-based propagation considerably aids in identification for THE BIG BANG THEORY and Movie Trailer Face datasets.

Tracking Results

To analyze the quality of the automatically generated face tracks, five movie trailers were used from the following dataset: 'The Killer Inside', 'My Name is Khan', 'Biutiful', 'Eat, Pray, Love', and 'The Dry Land'. Two CLEAR MOT metrics, Multiple Object Tracking Accuracy and Precision (MOTP and MOTA) were used for evaluation that better considered issues faced by trackers than standard accuracy, precision, or recall. The MOTA indicated how well the tracker did overall in regards to all of the ground-truth labels, while the MOTP appraised how well the tracker performed within the detections it found.

In Table shown below 2, the results compared to a standard face tracking method. The first column shows a KLT-based method, where the face detections are associated based on a ratio of overlapping tracked features, and the second shows the method according to the present invention (denoted as "Ours"). Both methods have similar precision, however the metrics have a larger coverage of total detections/tracks by 2% in MOTA with a 3.5× speedup. Results are available online.

TABLE 2

Tracking Results. Our method outperforms the
KLT-based [12] method in terms of MOTA by 2%.

| Video | | Method | |
|---|---|---|---|
| | | KLT[12] | Ours |
| 'The Killer Inside' | MOTP | 68.93 | 69.35 |
| | MOTA | 42.88 | 42.16 |
| 'My Name is Khan' | MOTP | 65.63 | 65.77 |
| | MOTA | 44.26 | 48.24 |
| 'Biutiful' | MOTP | 61.58 | 61.34 |
| | MOTA | 39.28 | 43.96 |
| 'Eat Pray Love' | MOTP | 56.98 | 56.77 |
| | MOTA | 34.33 | 35.60 |
| 'The Dry Land' | MOTP | 64.11 | 62.70 |
| | MOTA | 27.90 | 30.15 |
| Average | MOTP | 63.46 | 63.19 |
| | MOTA | 37.73 | 40.02 |

YOUTUBE Faces Dataset

Although face identification is the focus of the invention, the method of the present invention was also evaluated on the YOUTUBE Faces Dataset for face verification (same/not same), to show that the invention can also work in this context. The YOUTUBE Faces Dataset consists of 5,000 video pairs, half same and half not. The videos are divided into 10 splits each with 500 pairs. The results are averaged over the ten splits, where for each split one is used for testing and the remaining nine for training. The final results are presented in terms of accuracy, area under the curve, and equal error rate. As seen in Table 3, the invention provided competitive results with the top performing method MBGS, within 1% in terms of accuracy, and MSSRC even surpassed it in terms of area under the curve (AUC) by just below 1% with a lower equal error rate by 0.7%. All experiments were performed with the same LBP data and a λ value of

TABLE 3

YouTube Faces Database. Results for top
performing video face verification algorithm
MBGS and our competitive method MSSRC.

| Method | Accuracy ± SE | AUC | EER |
|---|---|---|---|
| MBGS [35] | 75.3 ± 2.5 | 82.0 | 26.0 |
| MSSRC (Ours) | 75.3 ± 2.2 | 82.9 | 25.3 |

Note:
MBGS results are different from those published, but they are the output of default setting in their code YOUTUBE Celebrities Dataset The YOUTUBE Celebrities Dataset [19] consists of 47 celebrities (actors and politicians) in 1910 video clips downloaded from YOUTUBE and manually segmented to the portions where the celebrity of interest appears. There are approximately 41 clips per person segmented from 3 unique videos per actor. The dataset is challenging due to pose, illumination, and expression variations, as well as high compression and low quality. Using the tracker disclosed in the present patent application, 92% of the videos were successfully tracked. The standard experimental setup selects 3 training clips, 1 from each unique video, and 6 test clips, 2 from each unique video, per person. Table 4 presents a summary of the results on YOUTUBE Celebrities, where the present invention outperformed the state-of-the-art by at least 6%.

TABLE 4

YouTube Celebrities Dataset. We outperform the best reported result by 6%

| Method | Acuracy (%) |
| --- | --- |
| HMM [19] | 71.24 |
| MDA [33] | 67.20 |
| SANP [16] | 65.03 |
| COV + PLS [34] | 70.10 |
| UISA [10] | 74.60 |
| MSSRC (Ours) | 80.75 |

BUFFY Dataset

The BUFFY Dataset consists of 639 manually annotated face tracks extracted from episodes 9, 21, and 45 from different seasons of the TV series "Buffy the Vampire Slayer". They generated tracks using the KLT-based method disclosed in Everingham et al., *Taking the bite out of automated naming of characters in TV video*, CVIU (2009). For features, SIFT descriptors are computed at 9 fiducial points as described in Cinbis et al., *Unsupervised metric learning for face identification in TV video*, ICCV (2011) and use their experimental setup with 312 tracks for training and 327 testing. Cinbis et al. present a Logistic Discriminant Metric Learning (LDML) method that learns a subspace. In their supervised experiments, they tried several classifiers with each obtaining similar results. However, using the classifier of the present invention, there is a slight improvement (Table 5).

TABLE 5

Buffy Dataset. We obtain a slight gain in accuracy over the reported method.

| Method | Accuracy (%) |
| --- | --- |
| LDML [9] | 85.88 |
| MSSRC (Ours) | 86.27 |

THE BIG BANG THEORY

THE BIG BANG THEORY dataset consists of 3,759 face tracks across the first six episodes of the first season of the popular show. There are a total of 11 actors that are known and one additional \unknown" label. The training data is collected by using a weakly supervised technique matching a video's speaker with the name in the script. Performance is evaluated using accuracy, where all of the unknown characters are considered as one class. The best-reported method combines Maximum Likelihood Regression (MLR) and Markov Random Fields (MRF) for an average performance over all of the episodes of 83.7% as shown in Table 6. MSSRC's performance is also shown, where the residual errors are used as a threshold to label unknowns. The weakly-labeled samples were used for each individual episode as the dictionary, except for the characters Raj and Howard where examples from all episodes were used to balance the dictionary. Using MSSRC provided a 2% increase and adding affinity-based propagation, which is a 4% improvement over the state-of-the-art. The increase due to affinity-based propagation was found to be 2% over MSSRC since most misses are due to "unknowns" and characters that have very few examples in the dictionary.

TABLE 6

The Big Bang Theory Dataset. MSSRC performs comparatively to the best reported results, but when combined with affinity-based propagation it outperforms the state-of-the-art by 4%.

| Method | BBT-1 | BBT-2 | BBT-3 | BBT-4 | BBT-5 | BBT-6 | Avg. BBT |
| --- | --- | --- | --- | --- | --- | --- | --- |
| MLR + MRF (Reported) | 95.18 | 94.16 | 77.81 | 79.35 | 79.93 | 75.85 | 83.71 |
| MSSRC | 94.47 | 89.56 | 82.84 | 81.58 | 81.05 | 84.37 | 85.65 |
| MSSRC + Affinity | 95.19 | 90.53 | 86.00 | 84.21 | 83.11 | 85.91 | 87.49 |

Movie Trailer Face Dataset

In this section, results on unconstrained Movie Trailer Face Dataset are presented. This dataset allowed for testing larger scale face identification, as well as each algorithms ability to reject unknown identities. Existing datasets do not capture the large-scale identification scope. The YOUTUBE Celebrities Dataset has unconstrained videos from YOUTUBE, however they are low quality and only contain 3 unique videos per person, which they segment. The YOUTUBE Faces Dataset and BUFFY Dataset also exhibit more challenging scenarios than traditional video face recognition datasets, however YOUTUBE Faces is geared towards face verification, same vs. not same, and BUFFY and Big Bang Theory only contains 8 and 11 actors respectively; thus, they are ill-suited for the large-scale face identification of the proposed video retrieval framework.

Figure 3:
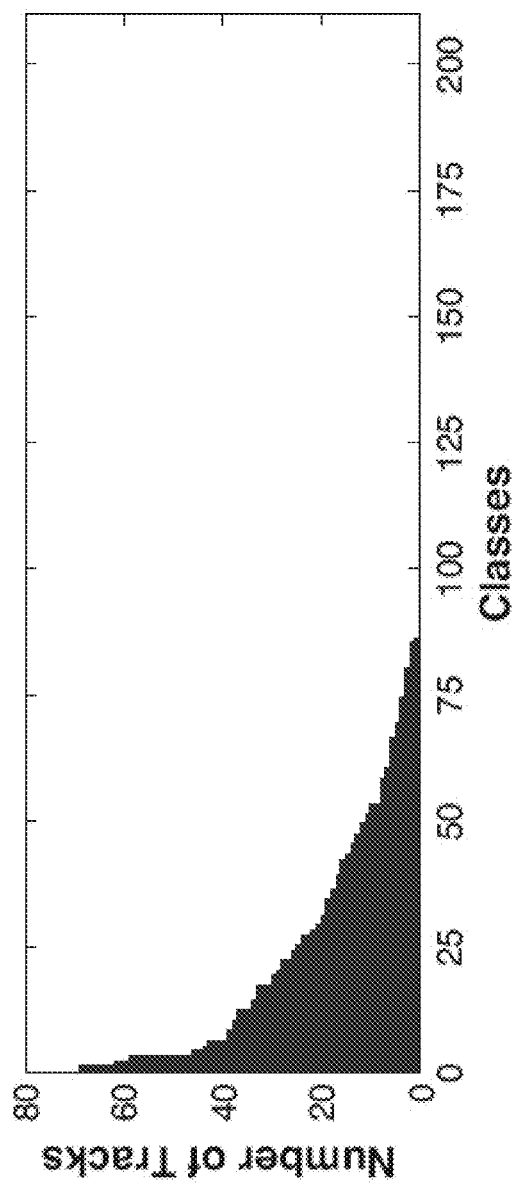
FIG. 3 is a graph of the distribution of face tracks across the identities in PubFig+10.

The Movie Trailer Face Dataset using 101 movie trailers from YOUTUBE from the 2010 release year that contained celebrities present in the supplemented PublicFig+10 dataset. These videos were then processed to generate face tracks using the method described above. The resulting dataset contains 4,485 face tracks, 65% consisting of unknown identities (not present in PubFig+10) and 35% known. The class distribution is shown in FIG. 3 with the number of face tracks per celebrity in the movie trailers ranging from 5 to 60 labeled samples.

The fact that half of the public figures do not appear in any of the movie trailers presents an interesting test scenario in which the algorithm must be able to distinguish the subject of interest from within a large pool of potential identities.

In a test scenario, the Public Figures (PF) dataset was chosen as a training gallery, supplemented by images collected of 10 actors and actresses from web searches for additional coverage of face tracks extracted from movie trailers. The maximum number of training images per person in the dataset was limited to 200 for better performance due to the fact that predictions are otherwise skewed towards the people with the most examples. The distribution of face tracks across all of the identities in the PubFig+10 dataset are shown in FIG. 3. In total, PubFig+10 consists of 34.522 images and the Movie Trailer Face Dataset has 4,485 face tracks, which was used to conduct experiments on several algorithms.

Algorithmic Comparison

The tested methods include NN, LDML, SVM, MLR, L2, SRC, and the method claimed in this patent application entitled MSSRC. For the experiments with NN, LDML, SVM, MLR, L2, and SRC, each individual frame of the face track was tested and predict its final identity via probabilistic voting and its confidence is an average over the predicted distances or decision values. The confidence values are used to reject predictions to evaluate the precision and recall of the system. All MSSRC experiments were performed with a λ value of 0.01.

Figure 4:
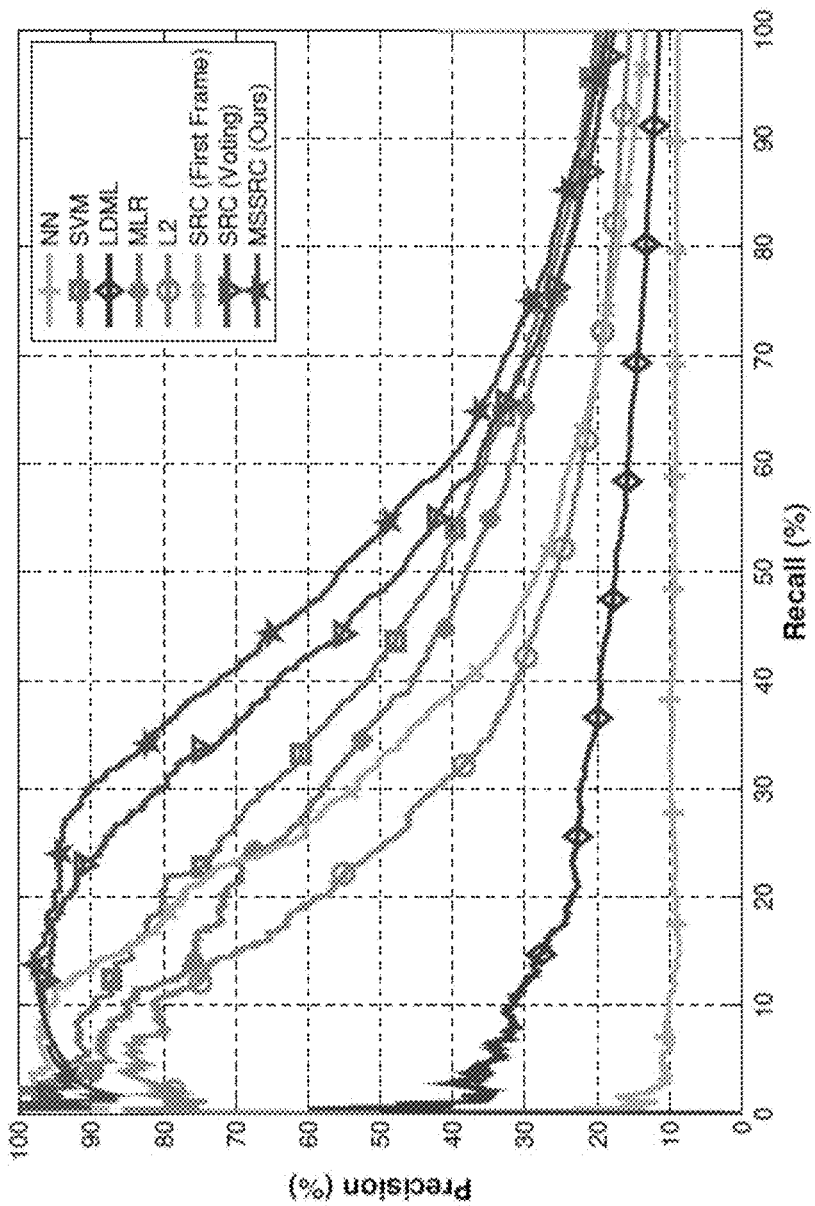
FIG. 4 is a graph of the precision of several face identification methods versus their recall percentage for the Move Trailer Face Dataset.

Table 7 presents the results for the described methods on the Movie Trailer Face Dataset in terms of two measures, average precision and recall at 90% precision. NN performs poorly in terms of both metrics, which explains why NN based methods have focused on finding "good" key-frames to test on. LDML struggles with the larger number of training classes vs. the BUFFY experiment with only 19.48% average precision. The L2 method performs quite well considering its simplicity. Similarly, MLR struggles at ignoring unknowns, but performs close to SVMs in terms of average precision. The SVM and SRC based methods perform closely at high recall, but not in terms of AP and recall at 90% precision with MSSRC outperforming SVM by 8% and 20% respectively. In FIG. 4, the SRC based methods reject unknown identities better than the others.

TABLE 7

Movie Trailer Face Dataset. MSSRC outperforms all of the non-SRC methods by at least 8% in AP and 20% recall at 90% precision.

| Method | AP (%) | Recall (%) |
|---|---|---|
| NN | 9.53 | 0.00 |
| SVM | 50.06 | 9.69 |
| LDML [9] | 19.48 | 0.00 |
| MLR [4] | 45.98 | 4.62 |
| L2 | 36.16 | 0.00 |
| SRC (First Frame) | 42.15 | 13.39 |
| SRC (Voting) | 51.88 | 23.47 |
| MSSRC (Ours) | 58.70 | 30.23 |

The straightforward application of SRC on a frame-by-frame basis and MSSRC (the invention) perform within 4% of each other, thus experimentally validating that MSSRC is computationally equivalent to performing standard SRC on each individual frame. Instead of computing SRC on each frame, which takes approximately 45 minutes per track, a face track is reduced to a single feature vector for $l^1$-minimization (1.5 min/track). MSSRC obtains better recall at 90% precision by 7% and 4% in average precision. Instead of fusing results after classification, as done on the frame-by-frame methods, MSSRC benefits in better rejection of uncertain predictions. In terms of timing, the preprocessing steps of tracking runs identically for SRC and MSSRC at 20 fps and feature extraction runs at 30 fps. For identification, MSSRC classifies at 20 milliseconds per frame, whereas SRC on a single frame takes 100 milliseconds. All other methods classify in less than 1 ms, however with a steep drop in precision and recall.

Effect of Varying Track Length

Figure 5A:
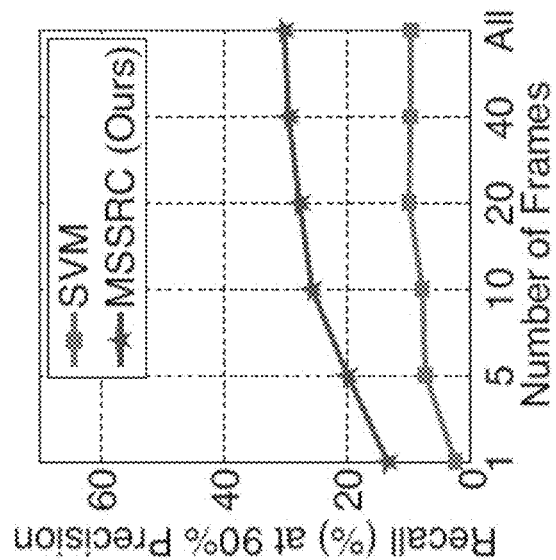
FIG. 5A is a graph of a relationship between the number of frames in a face track and the average precision of SVM and MSSRC methods.
Figure 5B:
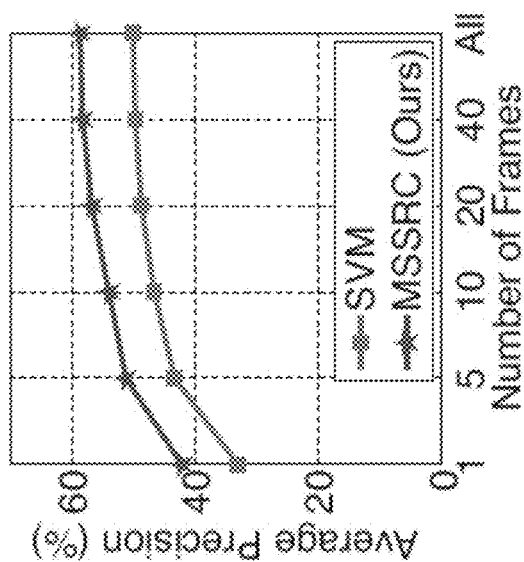
FIG. 5B is a graph of a relationship between the number of frames in a face track and the recall percentage at 90% precision for SVM and MSSRC methods.

To determine whether all tracked images are necessary, the first m frames are selected for each track and tested using the two best performing methods from the previous experiments: MSSRC and SVM. FIGS. 5A-B show that at just after 20 frames, performance plateaus, which is close to the average track length of 22 frames. The results show that using multiple frames is beneficial since moving from using 1 frame to 20 frames results in a 5.57% and 16.03% increase in average precision and recall at 90% precision respectively for MSSRC. Furthermore, FIGS. 5A-B show that the SVM's performance also increases with more frames, although MSSRC outperforms the SVM method in its ability to reject unknown identities.

Effect of Dimensionality Reduction

Figure 6:
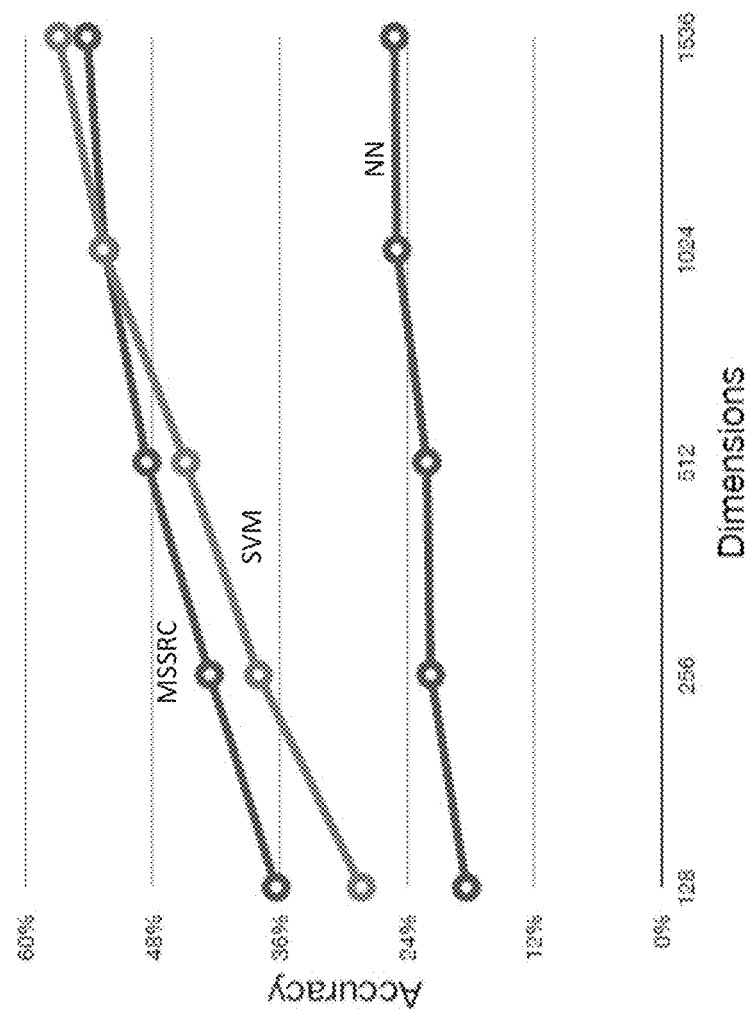
FIG. 6 is a graph of effects of dimensionality reduction on accuracy of three algorithms: NN, SVM, and MSSRC.

FIG. 6 shows the effect of dimensionality reduction on three algorithms, NN, SVM, and MSSRC. Increasing the number of dimensions benefits the SVM method the most, with all methods plateauing around 1536 dimensions for each feature. This is the maximum dimensionality of HOG's selected parameters.

Affinity-Based Propagation

Figure 7A:
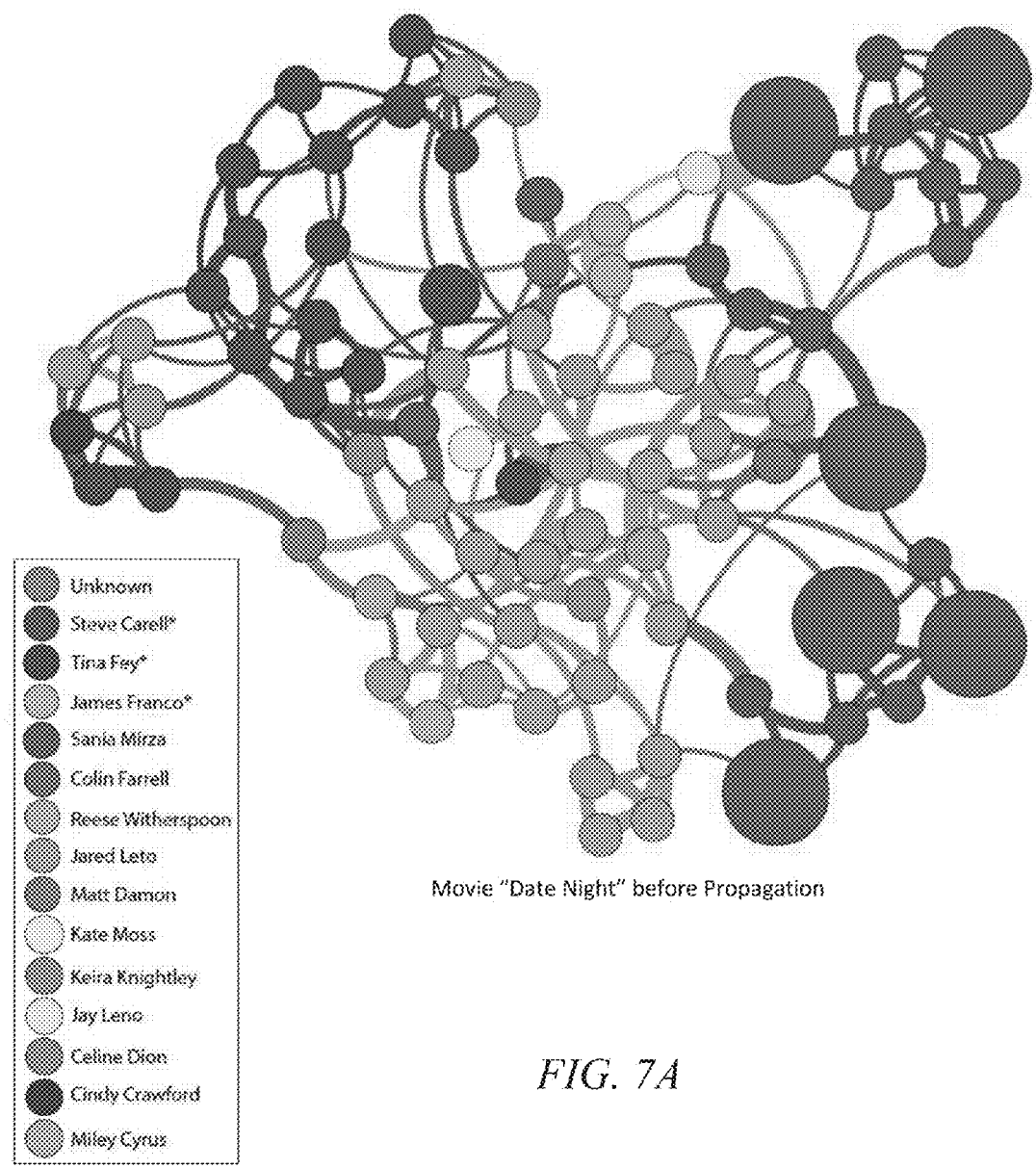
FIG. 7A is a graphical analysis of the movie "Date Night" before label propagation.
Figure 7B:
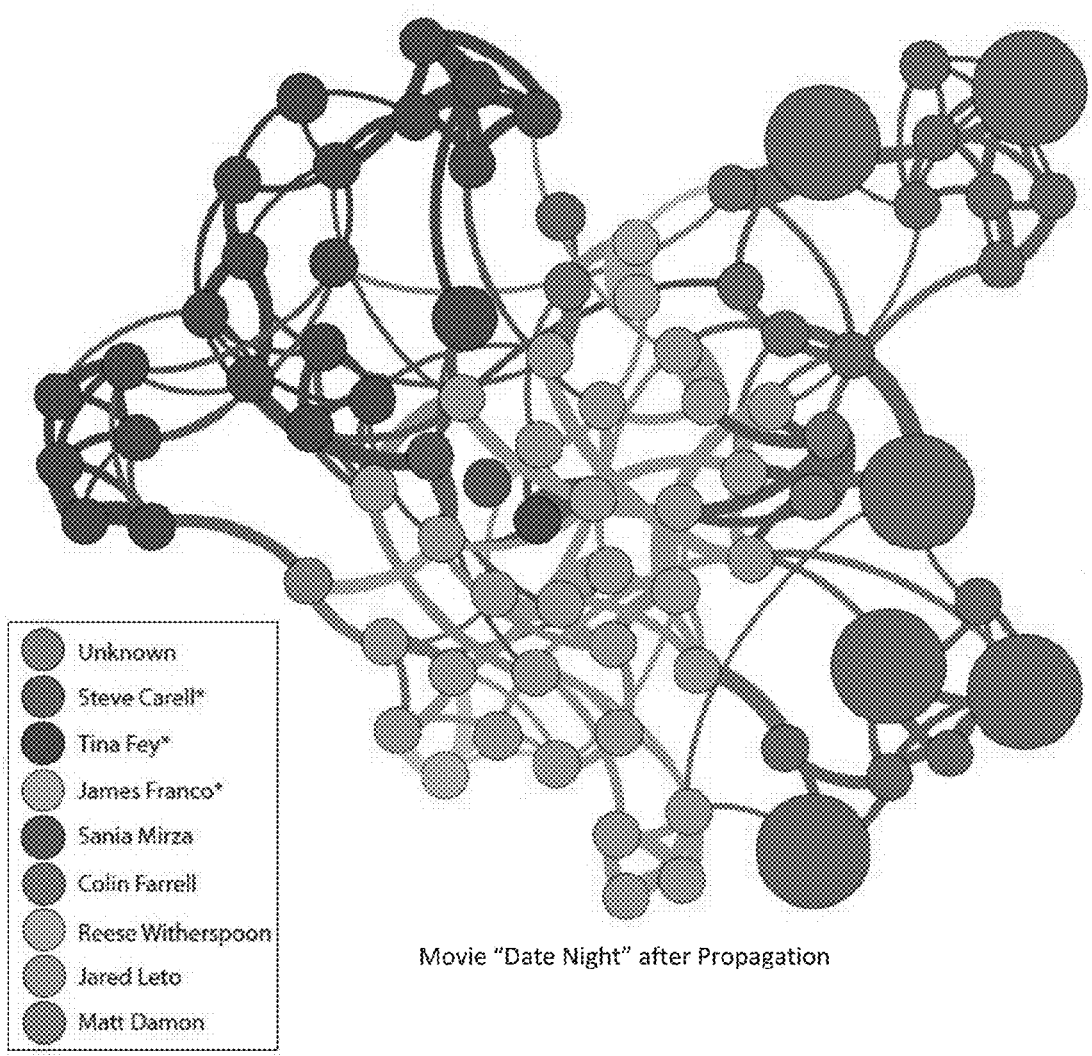
FIG. 7B is a graphical analysis of the movie "Date Night" after label propagation.
Figure 8B:
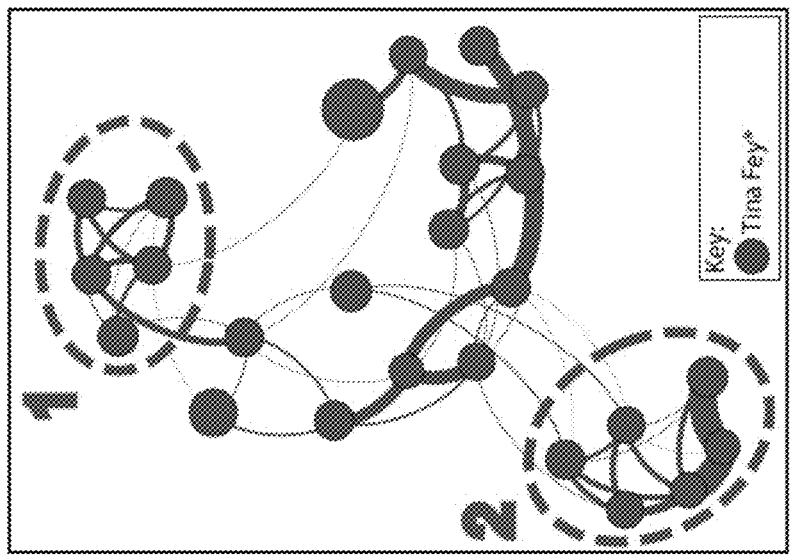
FIG. 8B is a subgraph from the movie "Date Night" for the actress Tina Fey after propagation.
Figure 8A:
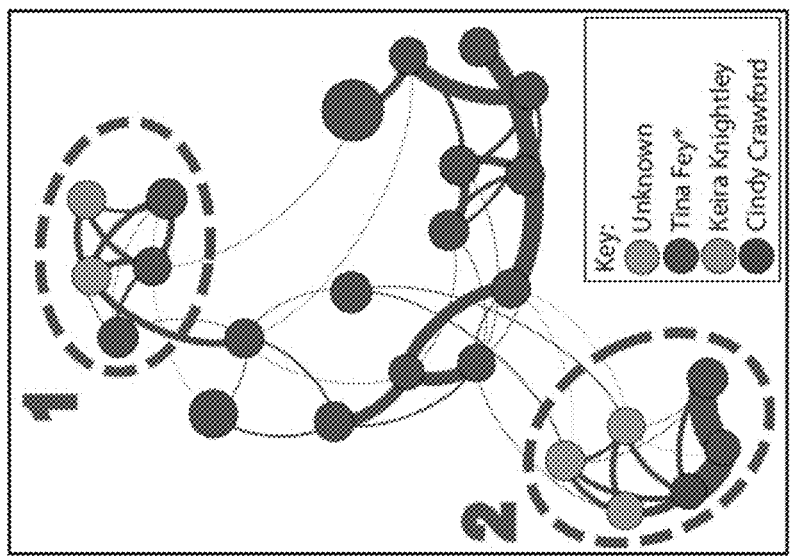
FIG. 8A is a subgraph from the movie "Date Night" for the actress Tina Fey before propagation.

FIGS. 7A-B depict a graphical analysis of the movie "Date Night" before and after label propagation. In this sample, it is evident that the graphs are divided into two distinct groups representing the two main characters in each movie. Furthermore, before propagation there is substantial confusion in the center of the graph where all of the \unknown" actors are concentrated with a few misclassifications within the two main character clusters. After label propagation, the misclassifications within the main character clusters are corrected, especially evident when zooming in on Tina Fey as depicted in FIGS. 8A-B. Moreover, confidence within the central region is correctly weakened so that in the end there is less confusion.

For repeatability, the affinity propagation parameters for the different schemes are reported in Table 8. For all experiments, $\sigma_a=1$, $\sigma_c=1$, and $\sigma_o=1$ as not much improvement was found by changing the smoothing parameter. All other parameters are obtained using a greedy parameter search, where the α's determine contribution from different affinities, K defines how many nearest neighbors each affinity graph uses, and the ω's defines how much the propagation scheme weighs the surrounding face track contribution versus the original class probabilities. For the fusion schemes, maximum average precision was optimized for accuracy and recalled at high precision individually, emphasizing different goals. For example, in a closed-universe scenario, accuracy over known individuals in the training dictionary is more important. However, in an open-universe scenario in which it is desirable to maximize rejection of unknowns with very accurate annotation, then maximizing precision is more important.

TABLE 8

Affinity-Based Propagation Propagation Parameters. These are the resulting parameters after optimizing for different metrics: average precision, accuracy, and recall at high precision.

| Parameters | K | ω | $α_a$ | $α_c$ | $α_o$ |
|---|---|---|---|---|---|
| MSSRC | N/A | N/A | N/A | N/A | N/A |
| Appearance | 5 | 0.7 | 1 | 0 | 0 |
| Coefficient | 10 | 0.7 | 0 | 1 | 0 |
| Co-Occurrence | All | 0.3 | 0 | 0 | 1 |
| Fusion (Max Acc) | 5 | 0.9 | 0.6 | 0.4 | 0 |
| Fusion (Max AP) | 5 | 0.8 | 0.6 | 0.3 | 0.1 |
| Fusion (High Proc) | 15 | 0.5 | 0.5 | 0.3 | 0.2 |

The K parameter defines how many nearest-neighbors to use for graph construction, ω parameter defines how much to weighing surrounding node contribution versus its initial label, and the αs define how much to weigh the three ditfferent affinity metrics.

Table 9 depicts the baseline result for MSSRC followed by the result of applying affinity-based propagation using the individual similarity metrics and their fusion. Compelling results that occur during the fusion of the different affinity metrics, the parameters are optimized for three different criteria: 1) Accuracy, 2) Average Precision, and 3) Recall at High Precision.

TABLE 9

Affinity-Based Propagation Results. We obtain a peak increase of 34.5% in accuracy and 12.6% in average precision.

| Metrics | Acc. | AP | R@90P | R@95P |
|---|---|---|---|---|
| MSSRC | 50.52 | 58.70 | 30.23 | 20.48 |
| Appearance | 75.36 | 70.02 | 31.14 | 16.45 |
| Coefficient | 75.62 | 69.40 | 31.34 | 25.41 |
| Co-Occurrence | 66.71 | 63.35 | 26.01 | 21.33 |
| Fusion (Max Acc) | 84.98 | 60.51 | 11.77 | 7.61 |
| Fusion (Max AP) | 77.18 | 71.30 | 31.14 | 16.51 |
| Fusion (High Prec) | 62.81 | 67.27 | 37.52 | 31.79 |

Accuracy: Maximum accuracy models are found a closed universe where all of the face tracks are of known identities in the dictionary. Best results occur by propagating the initial MSSRC predictions with an increase of about 34% accuracy over the baseline. Optimizing for high accuracy, however, negatively impacts recall at high precision shown in FIG. 9 by 12.9% at 95% precision to 18.5% at 90% precision.

Average Precision: Pursuing maximum average precision models an open-universe, where it is desirable to achieve a balance between accurately classifying known identities while rejecting unknowns with good precision. Optimizing for average precision using MSSRC results in an increase of 12.6%. Its benefit is evident by in FIG. 9 where an increase over the baseline (MSSRC) is shown, which yields the best compromise in terms of average precision and accuracy compared to the other fusion schemes, outperforming all curves except at the lower recall values (below 40%).

Figure 9:
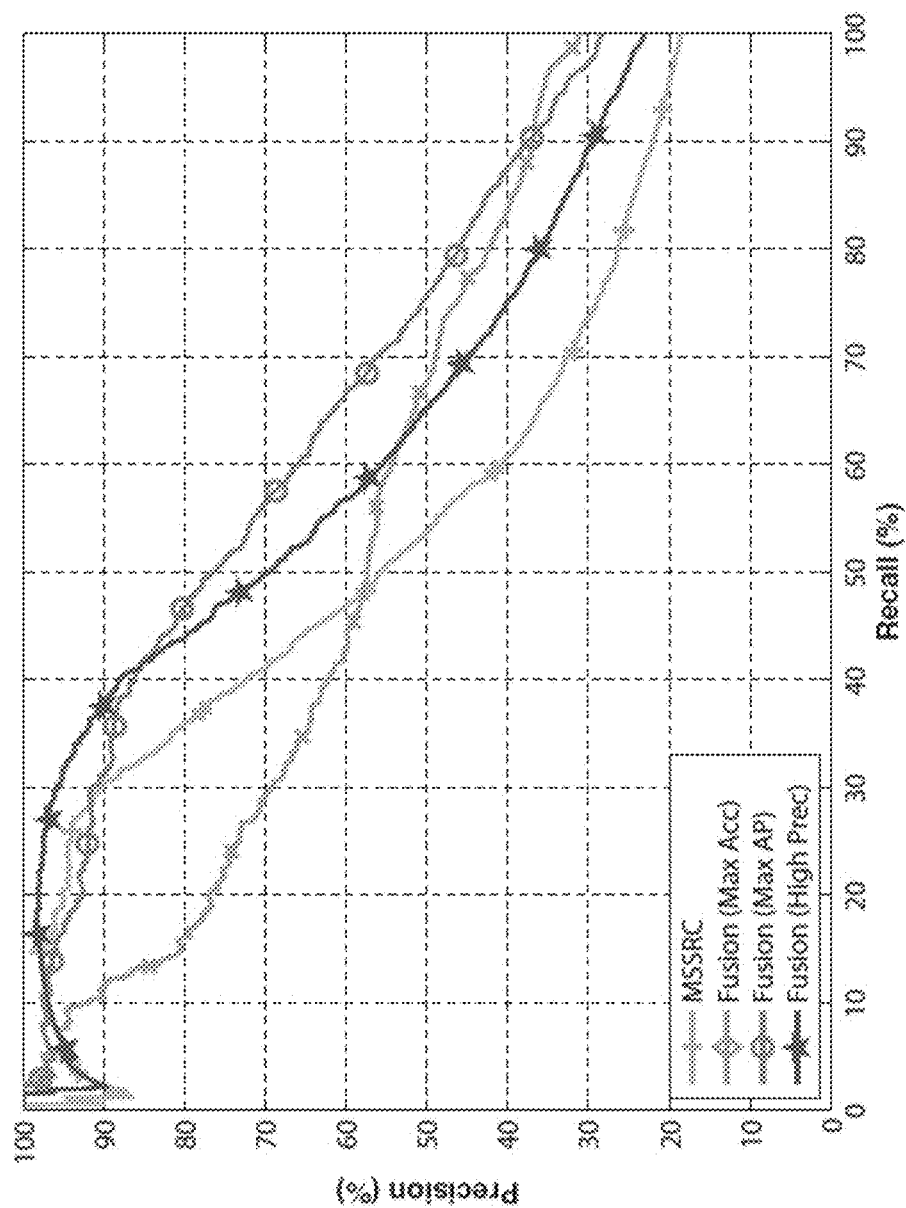
FIG. 9 is a graph illustrating affinity-based propagation precision and recall relationship for video face resonation method according to the present invention for various closed and open-universe models.

High Precision: FIG. 9 depicts that optimizing for recall at high precision provides a substantial increase over the baseline method, however does not outperform the Max AP scheme in overall precision. The results show that over 30% of the data can be labeled at greater than 95% precision and 37% of the data can be labeled at 90% precision via graph propagation, which is an increase of 11% and 7% respectively.

Table 8 also summarizes the relative contribution of each individual affinity metrics. The coefficient and appearance affinities attain similar results lagging behind max accuracy fusion by approximately 9% and max average precision fusion by less than 2%.

If the goal is maximum AP, then using only the coefficient similarity is a viable option because it is quicker to compute than the appearance similarity and only results in about 2% drop over fusing all of the affinities. The coefficient affinity outperforms appearance by 9% recall at 95% precision. The results for individual affinities are directly comparable to fusion while maximizing average precision. Fusion excels when maximizing accuracy and recall at high precision, where maximizing accuracy results in an increase of at least 9% over the individual affinities and 6% at high precision when maximizing recall at high precision.

In summary, it has been shown that in all cases, the graph-based affinity approach according to the present invention leverages track-similarity across an entire movie trailer to more consistently label tracks correctly with increased performance in terms of all metrics and convincingly show that for the most challenging dataset, MTFD, a substantial performance increase was obtained.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

GLOSSARY OF THE CLAIM TERMS

Appearance metric—information denoting data embodied in a local histogram of a face within a frame or a still image.

Appearance affinity—denotes a set-to-set distance between two or more face tracks using a background set of still images; appearance affinity is used to compute pairwise similarity between two or more face tracks.

Bounding box—an imaginary rectangular boundary encompassing a face within a frame or a still image.

Class probabilities—values used in a probability analysis to establish an initial identity of a face within a face track and an associated confidence value Coefficient affinity—a cosine distance between coefficient vectors of two or more face tracks; coefficient affinity is used to compute pairwise similarity between two or more face tracks Coefficient vector—a coefficient denoting a face track's relationship to still images within a dictionary Co-occurrence affinity—a metric based on comparison of the labels of two or more face tracks.

Confidence value—a measure of how distributed the residuals are across classes of still images within a dictionary; confidence value ranges from 0 when the face is represented equally by all classes to 1 when the face is fully represented by one class.

Dictionary—a collection of still images depicting faces of identified persons.

Face—a front of a human's head from forehead to chin.

Face track—a sequence of related frames within a video clip where all frames depict the face of the same person.

Frame—is a single still image within a video clip. A plurality of sequentially displayed frames make up a video clip.

Global histogram—a histogram of an entire frame encoding scene information; global histogram can be used to detect scene boundaries within a video clip to determine whether a frame is associated with an existing face track.

Initial identity—initial identity is calculated through MSSRC method relating a face depicted in frames of a face track to a still image of that person's face contained in a dictionary.

Level of similarity—a value denoting the relationship between location and appearance metrics of two or more frames or still images.

Local histogram—a histogram of a face within a frame encoding color information pertaining to the face.

Location metric—information denoting dimensional and spatial data of a face within a frame or a still image.

Similarity matrix—a matrix obtained as a result of fusing appearance, coefficient, and co-occurrence affinities metrics Sparsity constraint—a predefined parameter imposed on a coefficient vector for an $l^1$-minimization calculation. In an embodiment, the sparsity constraint may dictate that coefficient vector can only have non-zero entries for images from the same class and zeroes for all other images.

Transition probability matrix—a matrix obtain via normalization of similarity matrix; transition probability matrix is used in a random walks technique to propagate identity predictions of a face within one face track to other face tracks.

Video clip—a visual or audiovisual recording of moving visual images. A video clip comprises a sequence of frames, each frame being a single visual image. The video clip may be electronically coded and may be stored as a digital computer file.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A non-transitory computer-readable medium having stored thereon computer-executable instructions that, in response to being executed by a computing device, cause the computing device to perform operations comprising:
   receiving a video clip having a plurality of frames;
   receiving a dictionary of still images of a plurality of faces;
   detecting a first face within the video clip;
   tracking the first face over the plurality of frames of the video clip to obtain a first face track;
   computing a mean of the first face track;
   performing an $l^1$-minimization on the mean of the first face track under a predefined sparsity constraint; and
   computing class probabilities to establish an initial identity of the first face, wherein the identity of the first face is selected from the dictionary.

2. The computer-readable medium of claim 1, wherein a single coefficient vector is imposed on the plurality of frames within the first face track.

3. The computer-readable medium of claim 1, wherein the dictionary is normalized to obtain a unit $l^2$-norm.

4. The computer-readable medium of claim 1, further comprising calculating a confidence value, wherein the confidence value represents a likelihood of the first face being correctly identified.

5. The computer-readable medium of claim 1, further comprising:
   detecting a second face within the video clip;
   comparing location and appearance metrics of the second face and the first face; and responsive to the location and appearance metrics of the second face and the first face exhibiting a predefined level of similarity, associating the second face with the first face track.

6. The computer-readable medium of claim 1, further comprising:
   detecting a second face within the video clip;
   establishing a first bounding box encompassing the first face, a second bounding box encompassing the second face, and a third bounding box encompassing both the first and the second faces;
   calculating a ratio of the third bounding box to the first or the second bounding boxes; and
   responsive to the ratio satisfying a predetermined value, associating the second face with the first face track.

7. The computer-readable medium of claim 1, further comprising obtaining a global histogram for a frame and using the global histogram to evaluate whether the frame is associated with the face track.

8. The computer-readable medium of claim 1, further comprising ending the first face track in response to the first face not being detected in a predetermined number of frames following a frame in which the first face was initially detected.

9. The computer-readable medium of claim 1, wherein local histograms are used to determine whether a second face is associated with the first face track.

10. The computer-readable medium of claim 1, further comprising extracting facial features from the still images within the dictionary.

11. The computer-readable medium of claim 10, wherein facial feature extraction comprises:
    aligning the still images based on eye locations;
    removing a first order brightness gradient from the still images; and
    performing histogram equalization.

12. The computer-readable medium of claim 1, further comprising:
    calculating an appearance affinity, a coefficient affinity, and a co-occurrence affinity for the first face track and a second face track;
    converting the appearance affinity, the coefficient affinity, and the co-occurrence affinity into probability values using a standard sigmoid function; and
    combining the probability values using a weighted mean equation to obtain a similarity matrix;
    normalizing the similarity matrix to obtain a transition probability matrix;
    propagating the transition probability matrix and confidence values to subsequent face tracks to obtain a final face identification.

13. A non-transitory computer-readable medium having stored thereon computer-executable instructions that, in response to being executed by a computing device, cause the computing device to perform operations comprising:
    receiving a video clip having a plurality of frames;
    receiving a dictionary of still images of a plurality of faces having known identities;
    detecting a first face within the video clip;
    tracking the first face over the plurality of frames of the video clip to obtain a first face track;
    computing a mean of the first face track;
    performing an $l^1$-minimization on the mean of the first face track under a predefined sparsity constraint;
    computing class probabilities to establish an initial identity of the first face and a confidence value, wherein the initial identity of the first face is selected from the dictionary;
    calculating affinity metrics for the first face track and a second face track;
    fusing the affinity metrics to obtain a similarity matrix;
    normalizing the similarity matrix to obtain a transition probability matrix; and
    propagating the transition probability matrix and confidence values to subsequent face tracks to obtain a final face identification and a final confidence value for each face track.

14. The computer-readable medium of claim 13, wherein the affinity metrics are selected from the group consisting of an appearance affinity, a coefficient affinity, and a co-occurrence affinity.

15. The computer-readable medium of claim 13, wherein a single coefficient vector is imposed on the plurality of frames within the first face track.

16. The computer-readable medium of claim 13, further comprising ending the first face track in response to the first face not being detected in a predetermined number of frames following a frame in which the first face was initially detected.

17. The computer-readable medium of claim 13, wherein facial features are extracted from the still images within the dictionary by aligning the still images based on eye locations, removing a first order brightness gradient from the still images, and performing histogram equalization.

18. The computer-readable medium of claim 13, wherein local histograms are used to determine whether a second face is associated with the first face track.

19. The computer-readable medium of claim 13, further comprising:
    detecting a second face within the video clip;
    comparing location and appearance metrics of the second face and the first face; and
    responsive to the location and appearance metrics of the second face and the first face exhibiting a predefined level of similarity, associating the second face with the first face track.

20. The computer-readable medium of claim 13, further comprising obtaining a global histogram for a frame and using the global histogram to evaluate whether the frame is associated with the face track.

* * * * *